No. 676,789. Patented June 18, 1901.
C. W. WEIR.
CAN OPENER.
(Application filed Mar. 15, 1901.)

(No Model.)

Witnesses:
J. P. Appleman,
E. E. Potter.

Inventor
C. W. Weir.
By
H. C. Everts
Atty's.

UNITED STATES PATENT OFFICE.

CHARLES W. WEIR, OF WILMERDING, PENNSYLVANIA.

CAN-OPENER.

SPECIFICATION forming part of Letters Patent No. 676,789, dated June 18, 1901.

Application filed March 15, 1901. Serial No. 51,290. (No model.)

*To all whom it may concern:*

Be it known that I, CHARLES W. WEIR, a citizen of the United States of America, residing at Wilmerding, in the county of Allegheny and State of Pennsylvania, have invented certain new and useful Improvements in Can-Openers, of which the following is a specification, reference being had therein to the accompanying drawings.

This invention relates to certain new and useful improvements in can-openers, and relates mainly to a can-opening tool the handle of which is so constructed as to permit its use for various purposes.

Briefly described, the invention comprises a handle curved in one direction at one end and at the opposite end curved in the opposite direction, the said handle being provided intermediate its ends with an oblong slot in which a spring-held cutter is adjustably mounted. The handle carries at one end of the said slot a suitable shoe which is adapted to engage the periphery of the can as the opener is used and has arranged on the same side, near the opposite end of the slot, a brad or pick, which is adapted to be inserted into the top of the can to hold the cutter as the latter is moved around in a circle. All of this construction will be hereinafter more specifically described and then particularly pointed out in the claims, and in describing the invention in detail reference will be had to the accompanying drawings, forming a part of this specification, and wherein like numerals of reference will be employed for designating like parts throughout the several views of the drawings, in which—

Figure 1:
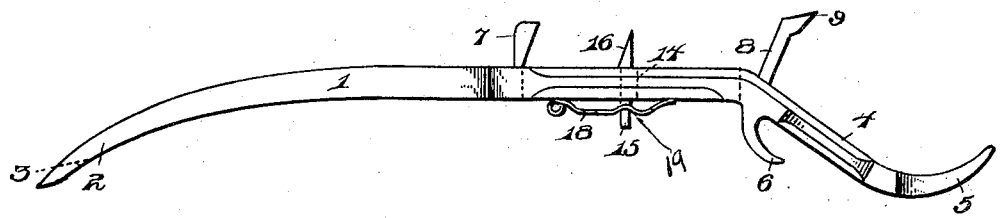
Figure 2:
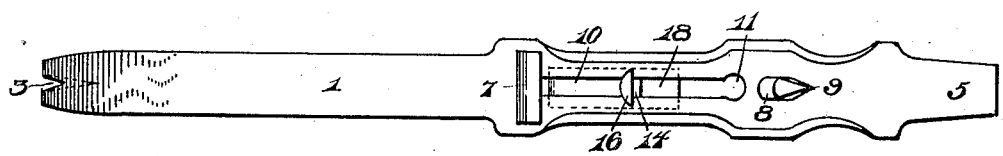
Figure 3:
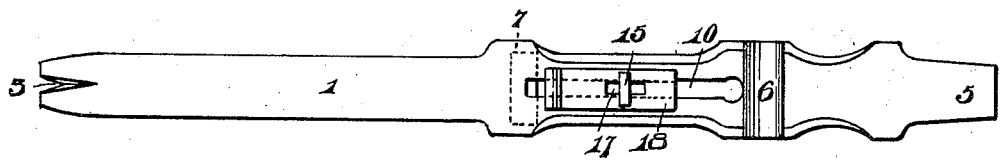
Figure 4:
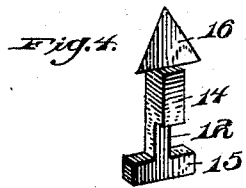
Figure 5:
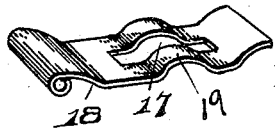

Figure 1 is a side elevation of my improved can-opener, showing the same in an inverted position. Fig. 2 is an underneath plan view of the same. Fig. 3 is a top plan view thereof. Fig. 4 is a detail perspective view of the cutter, and Fig. 5 is a like view of the spring which holds the cutter in position.

To put my invention into practice, I provide a handle 1, provided with a V-shaped notch 3 in the end 2 thereof. Near its other end this handle is bent downwardly at an incline of about forty-five degrees, as shown at 4, and then has the end turned upwardly to form a hook 5. At the rear end of the inclined portion 4 this handle carries an integral hook 6. As viewed in the drawings, the side of the handle uppermost in Figs. 1 and 2 I term the "underneath" side of the handle, and carried by this underneath side of the handle is a shoe 7 and an arm 8, the latter having a barb or brad point 9 at its free end. The handle is provided in the straight portion thereof, between the shoe 7 and the arm 8, with a longitudinal slot 10, terminating at one end in an enlarged opening 11. Mounted in this opening so as to be moved longitudinally therein is the cutter for opening the can. This cutter comprises a shank 12, having an enlargement 14 thereon, a head 15 on one end, and a triangular-shaped barb or cutter-point 16 on the other end. The shank of the cutter extends through a slot 17 in a spring 18, which lies against the upper face of the handle, as shown in Fig. 3 of the drawings. The head 15 of the cutter lies in engagement with a bow 19 in this spring, so as to hold the cutter in position, and the spring bears against the upper face of the handle with its ends, as shown in Fig. 1. The enlargement 14 on the shank lies within the slot in the handle and serves to give a greater bearing, and should it be desired to remove the cutter the same may be slid along to the enlarged opening 11, which will permit the turning of the cutter in the slot, so as to bring the head 15 in line with said slot and allow its removal.

In operation the brad or point 9 is inserted in the top of the can centrally or about centrally thereof and the cutter-point or barb 16 forced down into the top of the can. Then by moving the handle around in a circle the cutter 16 performs the cutting operation, while the cutter or brad 9 holds the device during such movement, the shoe 7 engaging the periphery of the can and also assisting in retaining the device in position.

While performing effectually the function of a can-opener, the tool may be used, when not desired for the above purpose, as a tack-lifter, the end 2 being constructed for this purpose. The hook 5 may be employed as a stove-lid lifter, and the inclined portion 4, together with the hook 6, may serve as an effectual pot-lifter, as will be readily apparent.

In the practice of the invention it will be observed that various changes may be made in the details of construction without departing from the general spirit of the invention.

Having fully described my invention, what I claim as new, and desire to secure by Letters Patent, is—

1. The combination with a handle having a longitudinal slot terminating at one end in an enlarged opening, a shoe carried on the underneath face of said handle at one end of the slot, an arm carried on the same side of the handle at the opposite end of the slot, said arm having a barb, of a shank mounted in said slot and provided on one end with a head, a barb or cutter-point carried on the other end of said shank, and a spring bearing against the upper face of the handle, and having a slot to receive the shank of said cutter, substantially as described.

2. In combination with a handle having a slot, a shoe carried by the underneath face of said handle at one end of the slot, an arm carried by the same face of the handle at the opposite end of the slot, a barb carried by said arm, a cutter mounted in said slot, and movable therein, said cutter having a head on one end, and a spring bearing against the upper face of the handle, said spring being slotted to receive the shank of the cutter and being engaged by the head of said cutter, as and for the purpose described.

In testimony whereof I affix my signature in the presence of two witnesses.

CHARLES W. WEIR.

Witnesses:
JOHN NOLAND,
E. E. POTTER.